April 24, 1951 J. A. JONES 2,550,483

TUNING CONTROL FOR TELEVISION SETS

Filed Jan. 16, 1950

INVENTOR.

Joe Allen Jones

Patented Apr. 24, 1951

2,550,483

UNITED STATES PATENT OFFICE 2,550,483

TUNING CONTROL FOR TELEVISION SETS

Joe Allen Jones, Falls Church, Va., assignor of one-third to Roberts B. Larson, Washington, D. C.

Application January 16, 1950, Serial No. 138,808

3 Claims. (Cl. 178—7.5)

This invention relates to television apparatus and the like, and more particularly to an arrangement for tuning or controlling the apparatus.

Television receiving sets, both of the direct viewing and projection type now in use commonly have a viewing screen which may comprise the front surface of a cathode ray tube in the case of a direct view device, or a ground glass or other viewing screen in the case of a projection type of set, and also a number of control knobs positioned usually on the front panel of the set adjacent the viewing screen. These control or tuning knobs are considered by some to be unsightly and may spoil what would otherwise be a more appealing appearance of the set.

In accordance with my invention, control knobs of the type commonly used are dispensed with either in whole or in part, and an entirely new type of controlling arrangement is provided. This new arrangement, broadly stated, comprises one or more rings or other control devices mounted substantially concentric with the viewing screen, whether it be in a direct view or projection type of television set, the ring or rings being connected by any suitable means such as rotatable shafts with the control circuit or circuits of the television set. These rings thus form an attractive frame for the viewing screen, and tuning is accomplished by manual rotation of one or more of the rings. By the word "tuning" is meant all of the operations which are normally carried out by means of the knobs now in use, such as the tuning or switching from station to station, the operation of brightness and contrast control circuits, the control of audio volume, the manipulation of vertical and horizontal hold controls, and any others which may be desirable.

It is a primary object of my invention to provide tuning control means for television sets and the like which comprises one or more rotatable rings located concentric with the viewing screen of the set and connected with the control circuit of the set by appropriate means so that manual rotation of the ring or rings accomplishes tuning of the set. As stated above, the invention is applicable to various types of television apparatus, such as direct view and projection types, and it is also applicable to other types of cathode ray tube apparatus such as various measuring and/or testing apparatus utilizing cathode ray tubes, as, for example, cathode ray oscillographs.

Figure 2:
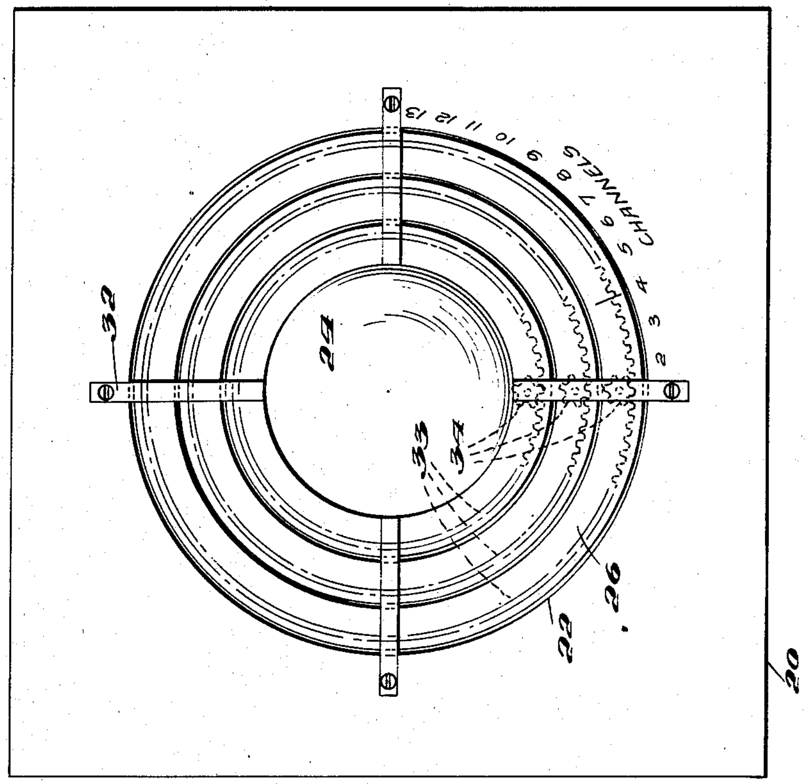
Figure 1:
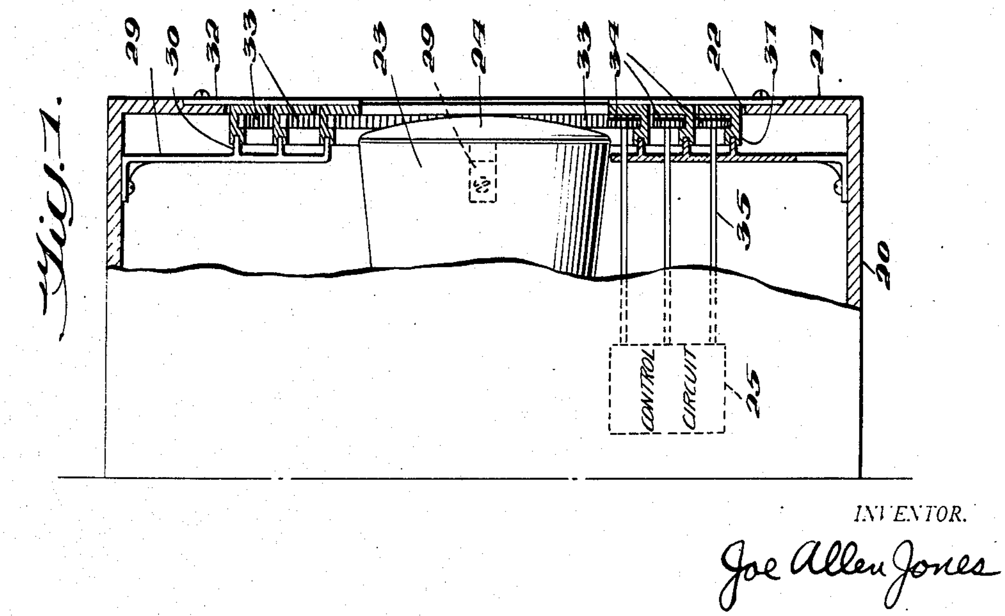

The above and other objects of the invention will be readily understood from the following specification when read in conjunction with the accompanying drawing, in which:

Fig. 1 is a side view, partly in section and partly diagrammatic, of a television set embodying my invention; and Fig. 2 is a front elevational view of the set shown in Fig. 1.

Referring now to the drawing, there is shown a cabinet 20 having a front panel 21 provided with a viewing opening 22 which may conveniently be circular. The television set shown in the drawing is of the direct view type in which a cathode ray tube 23 having a viewing surface 24 is located in or behind the viewing opening 22, and preferably substantially concentric therewith. It is to be understood that the viewing screen or surface 24 of the tube 23 could be replaced in a projection type of television set with a ground glass or other viewing screen without departing from the inventive concept, a direct view type of set being shown for convenience of illustration.

The cathode ray tube of the television set is controlled by a control circuit or circuits which are shown diagrammatically at 25, the exact nature of which control circuit comprises no part of the present invention. It is sufficient to say in describing the control circuit or circuits that the circuit is of the adjustable type in which various tuning adjustments are made in the operation of the television set. Tuning adjustments are made by means of variable elements in the circuit, as is well known.

In order to accomplish the various tuning adjustments of the control circuit shown diagrammatically at 25, one or more tuning rings 26 are provided, three such rings being shown in the drawing. It is to be understood that the number of these rings may be varied without departing from the inventive concept, the number of rings being governed generally by the number of tuning controls which are needed. Each ring may be used for a separate type of tuning, or switching or other means may be provided so that various types of tuning can be accomplished by each ring. It is also to be understood that the various rings may be made much smaller in radial thickness than they are shown, so that any desired number of these rings can be used without reaching excessive dimensions.

The various rings 26 may be knurled, or may have any other front surface configuration desired, and the tuning function of each ring may be indicated thereon by suitable indicia. It may be convenient to have the outermost ring control the tuning from station to station, and the various channel numbers could then be placed about the periphery of this ring with an arrow or other mark positioned on the ring to indicate the channel to which the set is tuned. These channel numbers could be positioned about only a portion of the periphery of the tuning ring as shown in Fig. 2, or they could be positioned so that greater movement of the ring would be necessary to cover the entire tuning band. Depending upon convenience, the entire tuning range of a ring may require one or more complete revolutions of the ring, or the entire range may require only a portion of a revolution.

Any convenient means may be provided for positioning the rings in the correct locations and guiding the rotational movement of the rings. Only a single example is shown in the drawing, but it is to be understood that any suitable mounting means for the ring or rings may be used. In Fig. 1, I have shown brackets or arms 29 mounted on the cabinet 20 and projecting toward the tube 23. These arms are positioned at suitable spaced locations about the cabinet, and may be used in any suitable number. In the drawing, it may be assumed that four of these supports are used, adjacent supports being positioned 90° apart.

The supports 29 may have suitable forwardly extending projections as shown at 30, and these projections serve as rails which engage in suitable annular grooves 31 in the rear portions of the rings, thus supporting the rings and providing a guide for the rotation of the rings.

Rearward movement of the rings 26 out of their desired positions may be prevented by the engagement of projections 30 in the grooves 31, and if necessary, forward movement of the rings may be prevented by suitable arms, such as those shown at 32, these arms being located on the front surface of the front panel 21 of the cabinet, so as to lie in front of the rings to define the limit of their forward movement. Any suitable number of the arms 32 may be used, four being shown in Fig. 2. Other types of means for positioning the rings may be used if desired.

Turning now to the means for transmitting movement from the rings 26 to the control circuit of the set to accomplish adjustment of the set, I wish it to be understood that any suitable motion transmitting means may be used. I have shown a simple mechanism in the patent drawing, but the invention is not to be limited in scope to the use of the particular type of transmitting mechanism which I have shown.

As shown in the drawing, each ring 26 is provided on an internal surface with gear teeth such as are shown at 33 on the innermost ring. These gear teeth may extend over the entire inner surface used, or over only a portion of this surface, depending upon the amount of rotation of the rings which will be necessary to cover the entire range of adjustments. Each set of gear teeth 33 cooperates with a small gear wheel as shown at 34, and each gear wheel is fixed to a rigid or flexible shaft or other similar means 35. The shafts 35 are, in turn, connected to the adjustable portions of the control circuit so as to accomplish tuning of the circuit upon rotation. For convenience of illustration, the three gears 34 and their shafts 35 are shown one above another in Fig. 2, but it is to be understood that these gears may be positioned at any desired points about the various tuning rings, their position being governed primarily by convenience. Any suitable additional gearing which may be necessary can be used in the transmitting of motion from the rings 26 to the control circuit.

Another simple manner of transmitting motion from the rings 26 to the shafts 35 would be by a friction drive in which the gear wheel 34 and/or the gear teeth 33 would be replaced by friction surfaces.

I wish it to be understood that the disclosure of the invention which I have set forth is not to be interpreted in a limiting sense, but is intended only to describe the best mode devised by me for carrying out the invention, as required by the patent statutes. Numerous modifications and deviations from the construction shown and described may be carried out without departing from the inventive concept which is defined by the appended claims.

I claim:

1. In television apparatus and the like having a viewing screen and an adjustable control circuit for said apparatus, which control circuit includes at least one variable element, an adjusting arrangement for said control circuit, comprising at least one ring rotatably mounted adjacent to and substantially concentric with said viewing screen and accessible to a person viewing the screen, a drive transmitting surface on at least a portion of said ring, and motion transmitting means driven from said surface and operatively connected with a variable element of said control circuit for adjusting said control circuit in response to movement of said ring.

2. Apparatus according to claim 1, in which said drive transmitting surface is toothed, and said motion transmitting means comprise a gear and shaft arrangement.

3. In television apparatus and the like having a viewing screen cooperating with a viewing opening in a cabinet and an adjustable control circuit which includes a plurality of variable elements, adjusting means for said control circuit comprising a plurality of relatively movable rings located at said viewing opening substantially concentric with said screen and with each other and accessible to a person viewing the screen, supporting means for said rings carried by said cabinet, and drive transmitting means connected to said control circuit and driven by rotation of the individual rings for adjusting the variable elements of said control circuit.

JOE ALLEN JONES.

REFERENCES CITED

The following references are of record in the file of this patent:

UNITED STATES PATENTS

| Number | Name | Date |
|---|---|---|
| 2,151,984 | Cleaver et al. | Aug. 12, 1941 |
| 2,435,564 | Atwood | Feb. 10, 1948 |

FOREIGN PATENTS

| Number | Country | Date |
|---|---|---|
| 110,923 | Australia | July 11, 1940 |
| 866,438 | France | Aug. 12, 1941 |